UNITED STATES PATENT OFFICE.

SALOMON AXELROD, OF OBER-SCHÖNEWEIDE, GERMANY, ASSIGNOR TO GENERAL ELECTRIC COMPANY, A CORPORATION OF NEW YORK.

PROCESS OF TREATING METAL CHIPS.

No. 863,134.     Specification of Letters Patent.     Patented Aug. 13, 1907.

Application filed December 29, 1904. Serial No. 238,729.

*To all whom it may concern:*

Be it known that I, SALOMON AXELROD, a subject of the Czar of Russia, residing at Ober-Schöneweide, Germany, have invented certain new and useful Improvements in Processes of Treating Metal Chips, of which the following is a specification.

In working up metal scrap or metal chips it has heretofore been customary to fuse the material in a smelting furnace in the ordinary way and to subsequently manipulate the material by pressing or rolling. This smelting process has the disadvantage of causing a considerable loss of the finely divided metal during heating especially if the operation is conducted on a large scale, for not only does the furnace blast carry off large quantities of the finely divided metal but it is also likely to oxidize, or otherwise change the fine chips under treatment. Aside from this the ordinary smelting process requires the separation of the different kinds of chips, as small quantities of alloys, as for instance brass, may produce unfavorable qualities in the resulting product by alloying or otherwise combining with other metals in the mixture of scrap thus producing a product quite different in many of its properties from any of its component metals.

The process forming the subject matter of this invention consists principally in assembling the separated metal particles by subjecting them to the combined influence of a moderate temperature and a very high pressure. The action is not a smelting action, as the metal chips are not raised to a temperature sufficient to fuse them, but only to, a temperature such that when simultaneously acted on by the high pressure the metal, when it reaches the so-called "flow limit" or "elastic limit" will attain a sort of pasty condition which will cause the separate particles to unite in a solid mass. The resultant solid block or body is, in a sense, a conglomerate containing the original metal chips united at their edges or surfaces but unalloyed or otherwise chemically changed beneath the surface of the separate particles.

This process may be carried out by placing the metal chips in a strong hydraulic press and there subjecting them to a temperature of approximately 500° C., and to a pressure sufficient to cause the particles to cohere into a solid block. If desired the press may then be used to transform the solid blocks into the desired form by forcing the metal through a suitable matrix, or the blocks may be rolled or manipulated in the ordinary way. It is also possible to put the metal chips into dies or forms and there treat them by my process to form directly a solid body of the desired shape.

What I claim as new and desire to secure by Letters Patent of the United States, is:

1. The process of treating a mixture of metal chips which consists in heating said chips to a temperature of approximately 500° C., and simultaneously compressing said chips beyond the elastic or flow limit of the metal to consolidate said chips into a solid mass.

2. The process which consists in subjecting a body of metal chips to the combined action of a heat of approximately 500° C., and a pressure sufficient to strain the metal beyond the elastic or flow limit thereby compressing the chips into a solid mass.

3. The process of treating a mixture of metal chips which consists in compressing said chips beyond the elastic or flow limit of the metal and simultaneously heating said chips to a temperature sufficient to cause the consolidation of the chips into a solid mass when so compressed, but not to a temperature sufficient to melt said chips.

4. The process of treating a mixture of metal chips which consists in subjecting said chips to strong compression and simultaneously heating said chips to a temperature lower than the welding temperature of iron at atmospheric pressure but high enough to produce adhesion between the metal chips of the mixture.

In witness whereof I have hereunto set my hand this third day of December, 1904.

SALOMON AXELROD.

Witnesses:
  HENRY HASPER,
  WOLDEMAR HAUPT.